Patented Dec. 14, 1926.

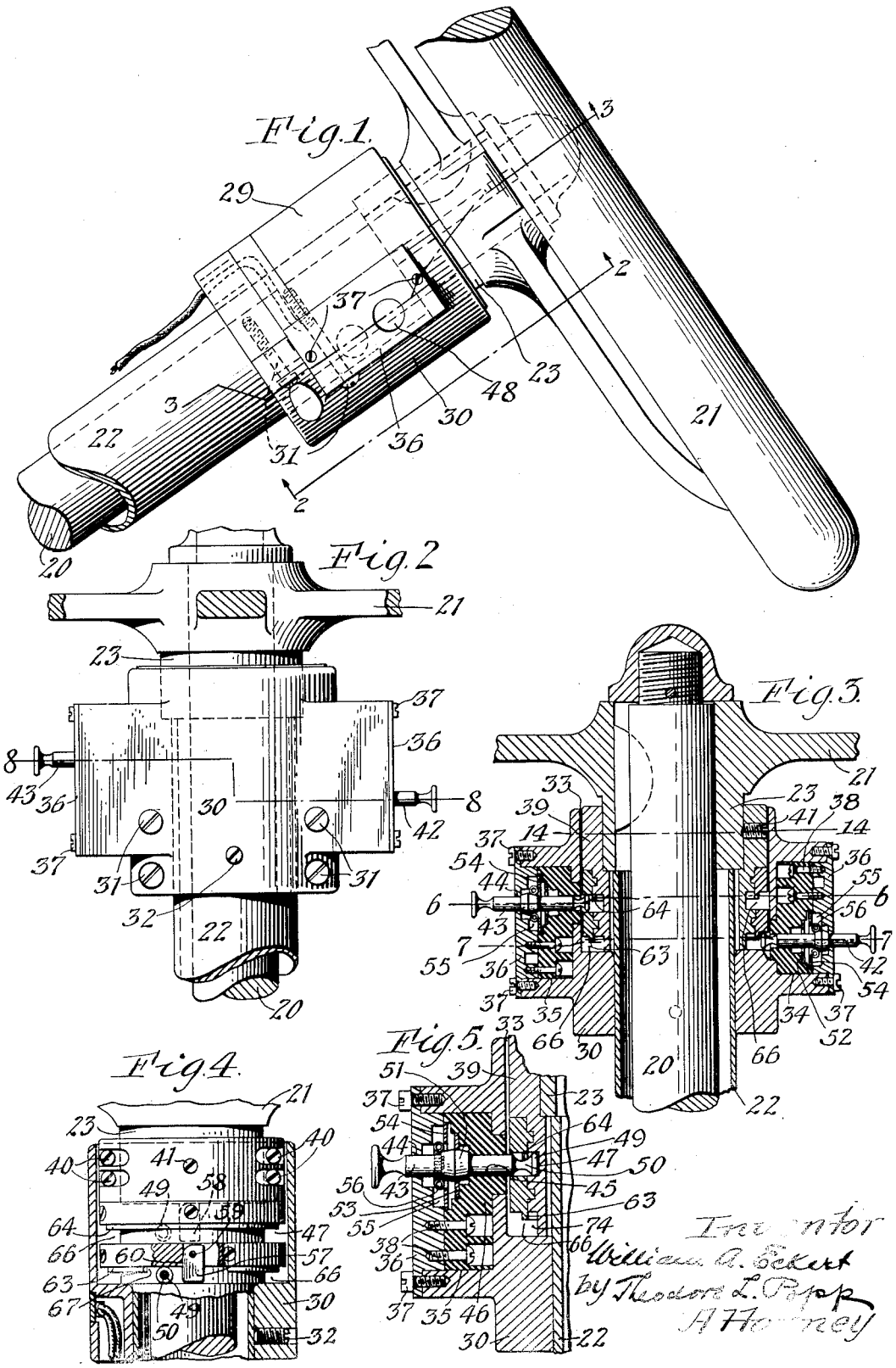

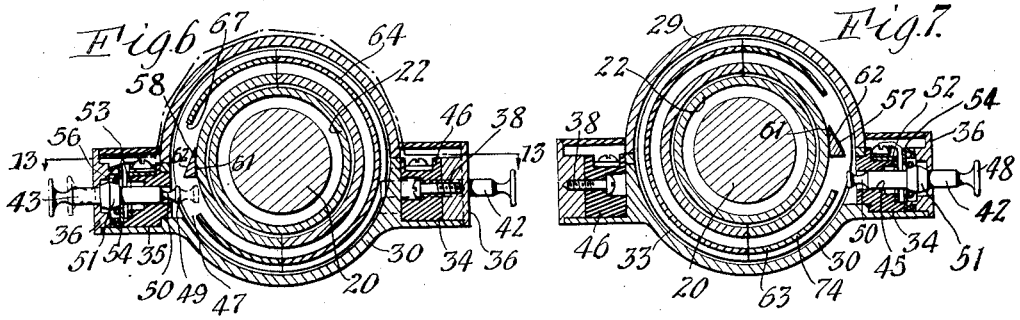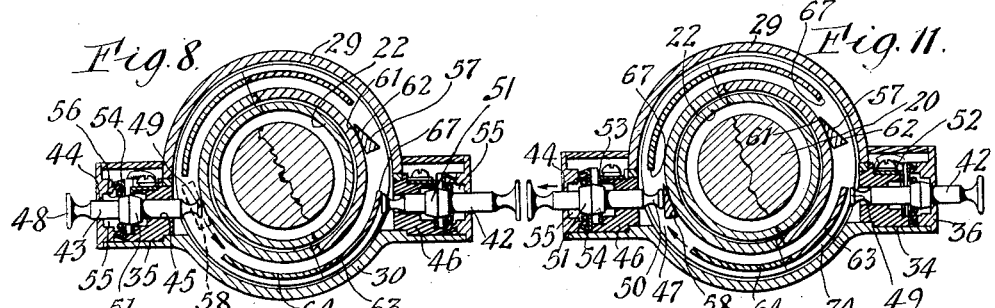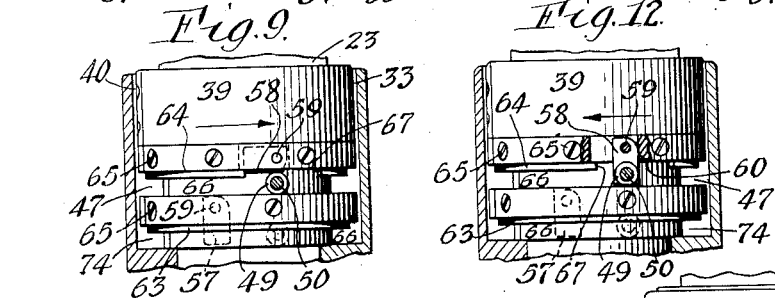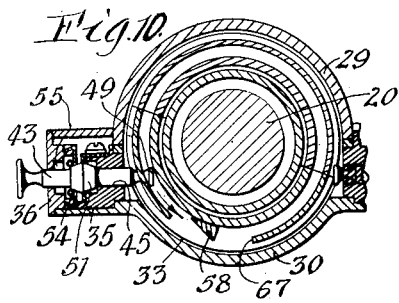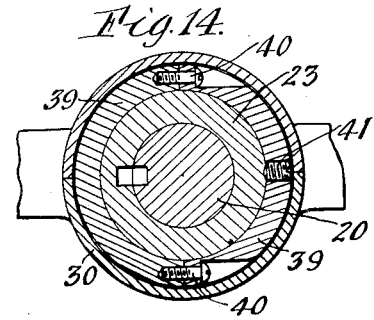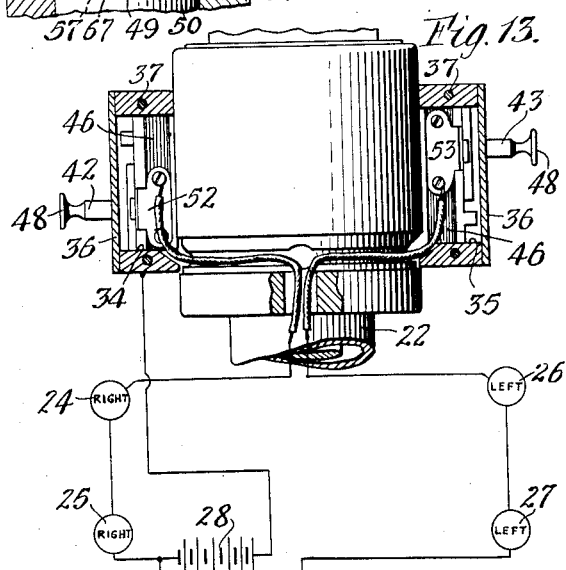

1,611,009

UNITED STATES PATENT OFFICE.

WILLIAM A. ECKERT, OF BUFFALO, NEW YORK.

SIGNAL-CONTROLLING MECHANISM FOR AUTOMOBILES.

Application filed April 23, 1923. Serial No. 633,850.

This invention relates to a mechanism for controlling direction signals on automobiles or similar vehicles and has the object to provide a controlling mechanism for this purpose of simple, durable and efficient construction which permits of setting a signal to indicate that the driver intends to turn either toward the right or to the left, or intends to continue ahead, and which when set for turning either to the right or to the left and the driver makes a substantial part of the turn in either direction, cannot unset the indicating signal manually but must complete the turn in the direction indicated and again assume a substantially straight course ahead when the restoration of the indicating signal to its inoperative condition will be effected automatically.

In the accompanying drawings: Figure 1 is a fragmentary side view of the steering gear of an automobile equipped with the controlling mechanism embodying my invention, looking at the same from the left. Figures 2 and 3 are longitudinal sections taken on lines 2—2 and 3—3, Fig. 1, looking forwardly. Figure 4 is a fragmentary sectional side elevation of the controlling mechanism viewed from the left. Figure 5 is a vertical section, on an enlarged scale, corresponding to the left hand part of the controlling mechanism shown in Fig. 3. Figures 6 and 7 are cross sections taken on the correspondingly numbered lines in Fig. 3, and showing the parts in their normal central position in which neither the right nor the left indicators or signals are set. Figure 8 is a cross section taken on line 8—8, Fig. 2, and showing the controlling mechanism set for giving a signal at the left and the steering post turned partway in that direction. Figure 9 is a fragmentary sectional side elevation of the part corresponding to Fig. 8. Figure 10 is a cross section on the same line as Fig. 8, but showing the steering post turned fully toward the left. Figure 11 is a view similar to Figs. 8 and 10 but showing the steering post returned partly to its normal central position. Figure 12 is a fragmentary sectional side elevation, similar to Fig. 9, but showing the part in the position corresponding to Fig. 11. Figure 13 is a longitudinal sectional elevation, taken on line 13—13, Fig. 6, looking rearwardly. Figure 14 is a transverse section taken on line 14—14, Fig. 3.

Similar characters of reference indicate corresponding parts throughout the several views.

In the embodiment of my invention shown in the drawings, the same is combined with a steering mechanism of an automobile the parts directly associated with my invention comprising a steering post 20 which is capable of turning and which has its lower end operatively connected with the steering wheels of the automobile, a hand wheel 21 connected with the upper end of the steering post, and a stationary tubular column 22 which encloses said post.

Upon the upper part of this column and the lower part of the hub 23 of the hand wheel is mounted the signal controlling mechanism which contains my invention. This signal may be of any desired audible or visible character, for instance, as shown in Fig. 13, the same may consist of two electric lamps 24, 25 mounted on the front and rear parts of the right side of a car and two electric lamps 26, 27 mounted on the front and rear parts of the left side of the car. The current for illuminating these lamps may be taken from any suitable source for instance from a battery 28. The lamps on the same side of the car are preferably in series and the corresponding ends of both series are connected with one terminal of the battery while the other terminal is grounded on some metal part of the controlling mechanism. The other ends of the two series of signal lamps are connected with the controlling mechanism of my invention in such manner that one or the other, or both, the circuits of these two series may be closed for illuminating the respective lamps and thus giving a direction signal accordingly to the traffic on the roadway indicating the direction the respective driver intends to pursue.

In the preferred embodiment of this controlling mechanism shown in the drawings, the same is constructed as follows:

29, 30 represent the two sections of a stationary casing which is of circular form and which has its sections surrounding the upper part of the column and connected with each other by screws 31, or the like, and also held against turning on the column by a set screw 32. This casing has the upper part of its bore enlarged to form a central chamber 33 and on its opposite sides the same is provided with side chambers 34, 35, which communicate at their inner ends with the central chamber while their outer ends are closed by caps or covers 36, 36, detachably connected with the casing by screws 37.

Within the central chamber 33 is arranged a rotary carier 39 which turns with the steering post and which has the form of a sleeve arranged with its lower part around the upper end of the column and its upper part around the hub of the steering wheel. This sleeve is divided diametrically and has its sections connected by screws 40 and the same is clamped on the hub of the steering wheel by a set screw 41, as shown in Fig. 14. Associated with the stationary casing and the rotary carrier are two electric switches which are adapted to open and close the circuits of the right and left signal lamps, respectively, which switches are constructed as follows:

42, 43 represent two switch plungers of metal which are in electrical contact with the metal of the casing so that in effect the same form two terminals for the grounded side of the battery 28. These plungers are mounted to move horizontally in the side chambers of the casing for which purpose each of these plungers is guided by sliding its outer part in a guide opening 44 in the cover 36 of the respective chamber while its inner part slides in a guide opening 45 formed in a block 46 of insulating material, which is arranged in the respective chamber and secured to the cover thereof by screws 38, as shown in Fig. 5. The plungers 42, 43 are arranged in different planes and adapted to move substantially radially so that their inner ends enter and leave circumferential channels 47, 74 arranged one below the other on the periphery of the carrying sleeve and the outer end of each plunger is provided outside of the casing with a button or finger piece 48 whereby the same may be manipulated. Adjacent to the inner end of each plunger the same is contracted to form an inner locking head 49 and a reduced neck 50 which connects this head with the body of the plunger. Intermediate of its ends each plunger has an enlargement 51 which has the form of a double cone tapering toward opposite ends of the plunger which conical enlargement forms part of the means for holding the plunger in its inner or outer positions and also as a movable contact of a switch for opening and closing one of the signal lamp circuits. For this purpose, the insulating blocks 46, 46 have secured thereto stationary metal contacts 52, 53, which are connected respectively, with those sides of the two signal lamp circuits opposite to the sides thereof which are connected with the battery or source of electricity. Each of these stationary switch contacts has an opening through which the inner part of the respective plunger is free to move without engaging therewith but the plunger when in its innermost position engages its enlargement 51 or movable contact with the respective stationary contact around the opening therein and thereby closes the electric circuit of the corresponding signal lamps. On the outer side of each insulating block is arranged a retaining plate 54 which is spaced apart from the adjacent cover 36 forming therebetween a recess 55 in which an annular detent spring 56 is arranged, which surrounds the plunger and is adapted to jump over the enlargement 51 alternately from one side to the other for yieldingly holding the plunger in its outer or inner position. Upon pushing the plunger inwardly the enlargement thereof expands the detent spring and causes the latter to jump from the inner to the outer side of the enlargement and holds the plunger yieldingly in its inner position in which the enlargement now acting as a movable contact engages with the companion fixed contact and thereby lights the lamps of the respective signaling circuit. Similarly, when the plunger is moved outwardly its enlargement expands the detent spring and causes the same to jump from the outer to the inner side of the enlargement and thereby yieldingly hold the plunger in its outer position in which the movable contact enlargement is disengaged from the companion fixed contact and the circuit of the respective signal lamps is broken to extinguish the light of the same.

By the means thus far described, it will be apparent that the driver of the car while at the wheel can readily and conveniently push in either of the switch plungers for lighting the signal lamps of the car on either side and thus notify the traffic on the roadway as to which side the driver intends to turn the car.

Means are provided whereby the signals when once set and the driver has effected the initial part of the turn in the direction indicated must complete this turn and then straighten out his course before the set signals can be again extinguished, the extinction of the signals being effected automatically during the last part of the straightening out operation of the car by the steering gear. The preferred form of means for accomplishing this purpose are constructed as follows:

57, 58 represent two return cams which operate to return the plungers to outer inoperative position and which are arranged on substantially diametrically opposite sides of the rotary carrier. The cam 58 is arranged in the upper channel 47 and, in the normal central position of the steering gear, stands in front of the path of the left hand switch plunger, and the cam 57 is arranged in the lower channel 74, and, in the normal or central position of the steering gear, stands in front of the path of the right hand switch plunger 42, as shown in Figs. 7 and 6, respectively. Each of these cams is pivoted at its upper end on the adjacent part of the carrier by a pin 59 so as to be capable of swinging forwardly from a position across the respective channel to a position parallel therewith but the cam is prevented from swinging rearwardly from a position across this channel to a position parallel therewith by means of a stop 60 arranged on the carrier and adapted to be engaged by the rear side of the respective cam for holding the same against swinging backwardly, as shown in Figs. 4 and 12. Each of these cams has an upright rear face 61 and an inclined front face 62, and the same hangs normally by gravity in a pendant position in which it extends across the respective channel of the carrier.

If the driver wishes to give a signal that he intends to turn to the left from a straight ahead course, he pushes the left plunger 43 inwardly from the position shown in full lines to the position shown by dotted lines in Fig. 6, thereby closing the left hand circuit and lighting the lamps in the same which notify the traffic accordingly. As the driver now turns the carrier with the steering post to direct the car to the left, the left hand returning cam during the first part of its rearward movement which occurs at this time on the left side of the carrier, causes this cam to be lifted by engagement with the left plunger, as shown in Figs. 8 and 9, and remain in this position until this side of the carrier has moved rearwardly far enough to permit the left cam to fall behind the left plunger into a position across the channel 47, as shown in Fig. 10. After this, continued turning of the carrier in the same direction for completing the desired amount of turn in this direction, causes the left cam to be carried rearwardly away from the left hand plunger a corresponding distance. When the left hand turn has been completed and the driver restores the steering gear to its central or normal position, the inclined front face of the left returning cam, now rigid and moving forward at this time, engages the inner end of the left plunger and pushes the same outwardly, as shown in Figs. 11 and 12, thereby automatically opening the switch which controls the signal lamp in the left hand circuit and extinguishing the same.

In a similar manner, a signal can be given by the driver that he intends to turn to the right by pushing in the right plunger which operates to close the right hand signal circuit. During the first part of the subsequent turn of the steering gear toward the right, the right return cam is moved rearwardly over the right plunger and into a position in rear of the same, during which time the right return cam is idle. But during the subsequent straightening of the steering gear after making a right turn, the right cam, now rigid and moving forwardly, engages its inclined front side with the inner end of the right plunger and pushes the same outwardly, so that the right hand switch is automatically opened and the signal lamps in the corresponding circuit are extinguished.

While the return cam on one side of the carrier is moving rearwardly relatively to its corresponding plunger, the other return cam is moving forwardly idly relatively to its companion plunger without changing the position of the latter. If the driver should unintentionally push in both plungers at the same time, no harm would ensue inasmuch as the double signal would merely serve to put other drivers and pedestrians on their guard until the signals had been again unset by the person setting the same.

Means are provided whereby the driver, after effecting the initial part of the turn in either direction from a straight course, cannot manually unset the signals which have been set by pushing in one or the other of the plungers, but necessitates straightening the course of the car by returning the steering gear to its central position and thus automatically unsetting the signals. The preferred means for accomplishing this purpose comprise locking flanges 63, 64 arranged circumferentially on the carrier adjacent to the upper side of the annular channels 47, 74, therein, and each detachably secured thereto by screws 65 and having their lower edges spaced apart from the lower parts of the respective channel by an intervening slot 66. Each of these locking flanges is provided immediately in front of the returning cam in the corresponding channel with a gap or passage 67 through which the head at the inner end of the adjacent plunger is capable of moving into and out of this channel, and the lower edge of each locking flange is so arranged that upon turning the carrier in either direction after pushing a plunger inwardly, this flange will engage with the inner reduced part of the plunger forming the neck of the same and thereby prevent this plunger from being moved outwardly by hand, after the same has been pushed in to set the signal and the steering gear has been turned a substantial extent in one direction or another. It is only when the steering gear has been returned to the central position and the gaps or passages 67 are in line with the plungers that the latter are free to be either pushed in to light the signal lamps or to be pulled out to extinguish the same.

It follows from this construction that when a driver has once set the signals either for a right or left turn and has effected the initial part of either of these turns, the respective plunger is locked in its operative position and the respective return cam has passed rearwardly beyond this plunger so that unsetting of the signal cannot be effected until the car has completed its turn in the direction set and the steering gear has again been returned to its central position, during which return movement the signals are unset automatically and therefore requires no attention on the part of the operator for this purpose.

If the driver should accidentally push in both plungers both of them will be locked in their inner operative position but when the steering gear is returned to normal, only the plunger on that side toward which the car actually turned will be restored automatically while the plunger on the opposite or wrong side will have to be restored by hand.

If a plunger is pushed in by mistake, the same can always be withdrawn manually so long as the steering wheel has not been turned in either direction sufficiently to engage the locking flanges with the necks of the plungers.

After the signal has been set for turning to one side and the turning movement has begun, it is also impossible to set the signal for the other side, because inward movement of the other plunger is prevented by engagement with the outer side of the respective locking flange.

This signal controlling mechanism for automobiles is very desirable by reason of the fact that it permits turning signals to be given at any time before the turning movement is actually begun and thereafter the signal cannot be discontinued until the turning movement has been completed, thus materially increasing the safety of automobile traffic and relieving the operator of the necessity of restoring the signals and only requiring him to set the signals preparatory to making turns.

By dividing the casing and carrier in the manner shown and described, it is possible to apply this signal controlling mechanism to the steering mechanism of automobiles after the latter is completely assembled in a car and ready for use.

I claim as my invention:

1. A signaling mechanism for automobiles having its steering gear provided with a rotary steering post and a stationary column surrounding said post, a stationary casing mounted on said post, a rotary carrier mounted on said post, fixed contacts mounted on said casing, movable contacts adapted to be shifted manually into engagement with said fixed contacts and comprising plungers adapted to be manually moved inwardly into engagement with said fixed contacts, and return cams arranged on said carrier and adapted to engage said plungers and move the same outwardly out of engagement with said fixed contacts, each of said return cams being pivoted on said carrier and free to swing forwardly out of its normal position to clear the corresponding plunger upon engaging the same but held against swinging rearwardly out of its normal position and having an abrupt rear side and an inclined front side adapted to engage the side and end respectively of the respective plunger.

2. A signaling mechanism for automobiles having its steering gear provided with a rotary steering post and a stationary column surrounding said post, a stationary casing mounted on said post, a rotary carrier mounted on said post, fixed contacts mounted on said casing, movable contacts adapted to be shifted manually into engagement with said fixed contacts, means arranged on said carrier and co-operating with said movable contacts for automatically disengaging the same from said fixed contacts, each of said plungers being provided at its inner end with a head and a reduced neck, and a locking flange arranged on said carrier and adapted to engage the neck of the plunger and hold the latter in engagement with its companion fixed contact.

3. A signaling mechanism for automobiles having its steering gear provided with a rotary steering post and a stationary column surrounding said post, a stationary casing mounted on said post, a rotary carrier mounted on said post, fixed contacts mounted on said casing, movable contacts adapted to be shifted manually into engagement with said fixed contacts, means arranged on said carrier and co-operating with said movable contacts for automatically disengaging the same from said fixed contacts, each of said plungers being provided at its inner end with a head and a reduced neck, and a circumferential locking flange secured to the periphery of said carrier and provided with a passage for said head and adapted to engage its circumferential edge with said neck for locking said plunger in its inner position in engagement with the companion fixed contact.

WILLIAM A. ECKERT.